May 25, 1926.
G. E. HOHAUS
HAY AND GRAIN STACKER AND LOADER
Filed July 2, 1925
1,585,915
3 Sheets-Sheet 2
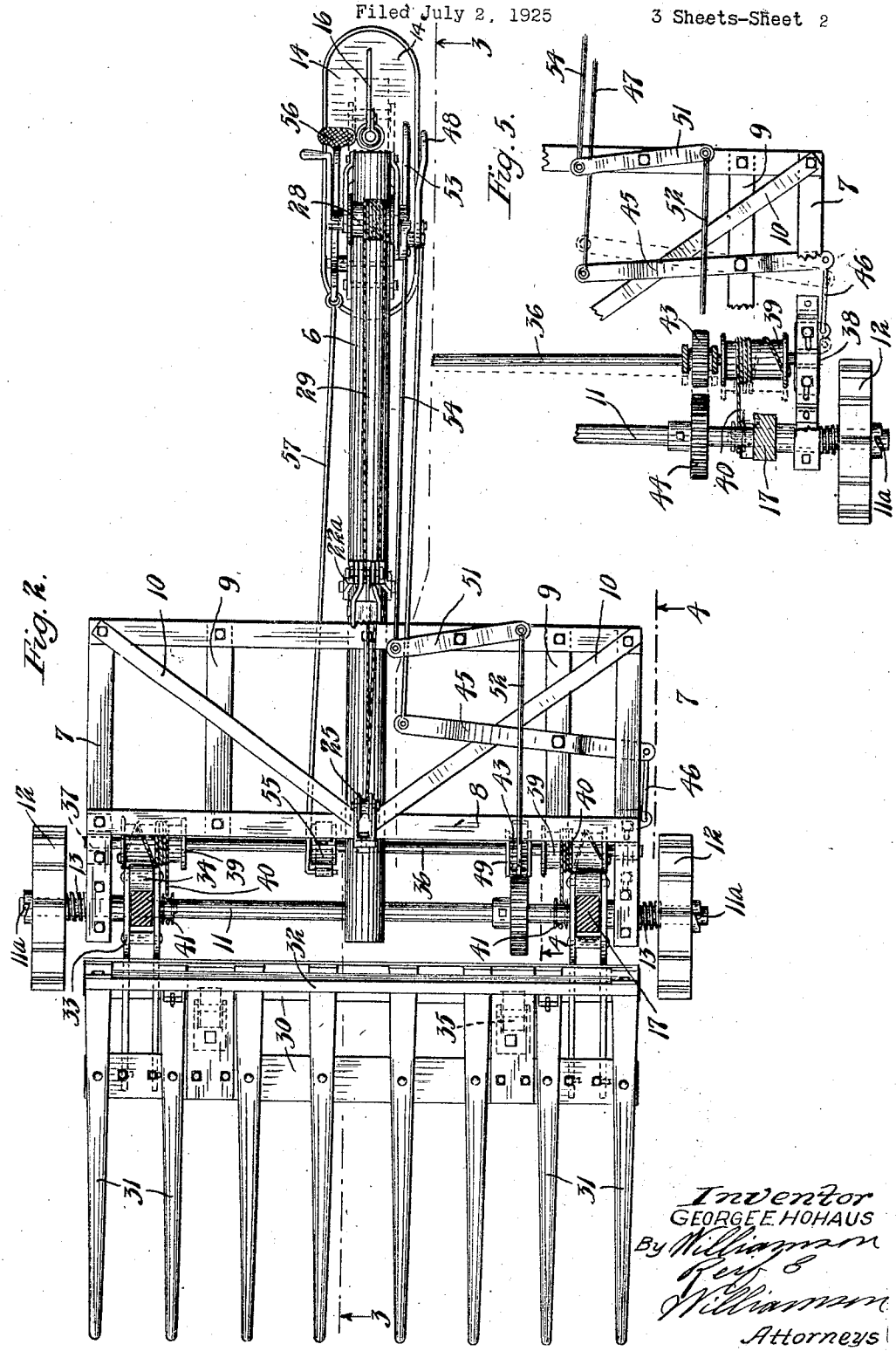
Inventor
GEORGE E. HOHAUS
By Williamson
&
Williamson
Attorneys

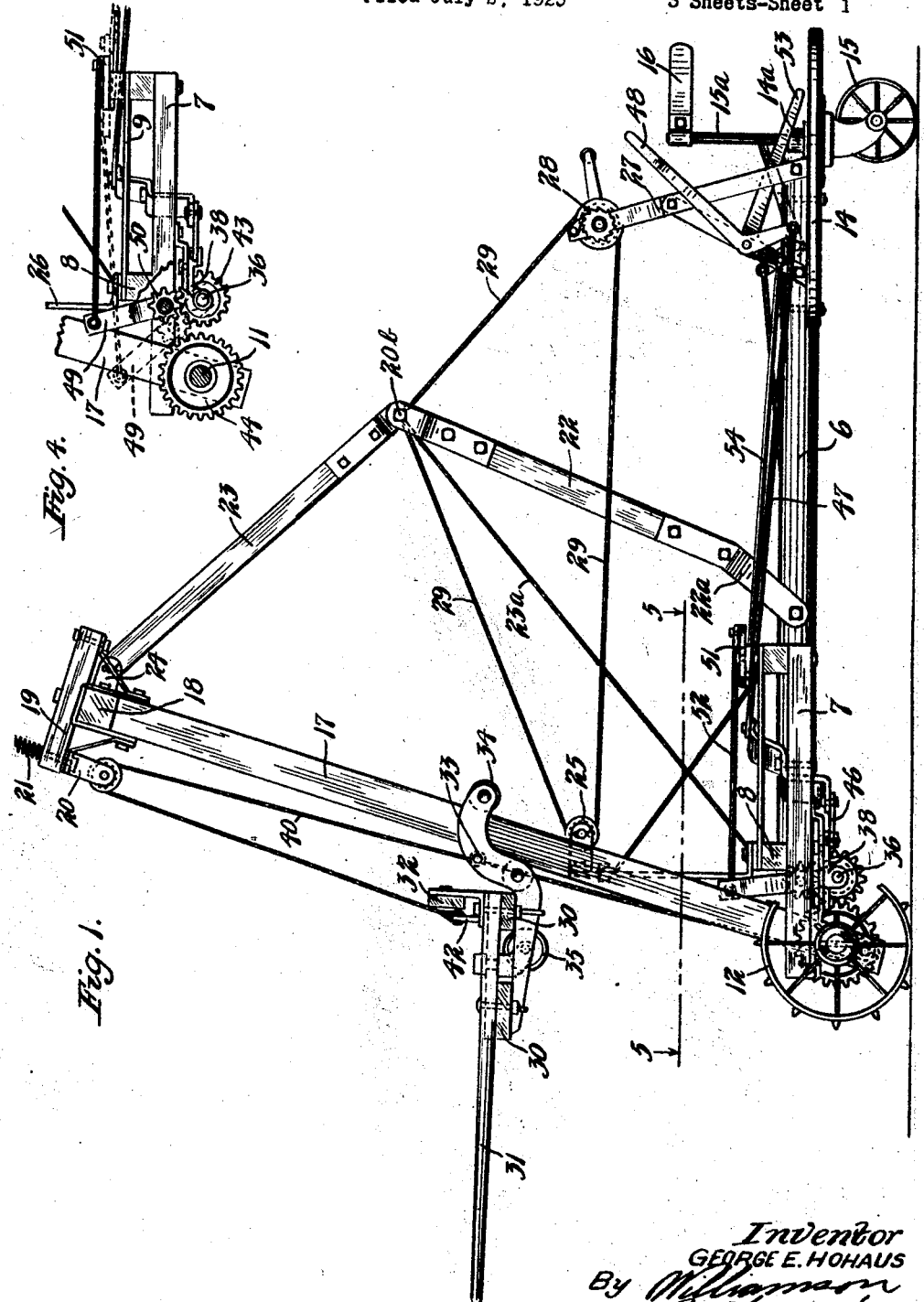

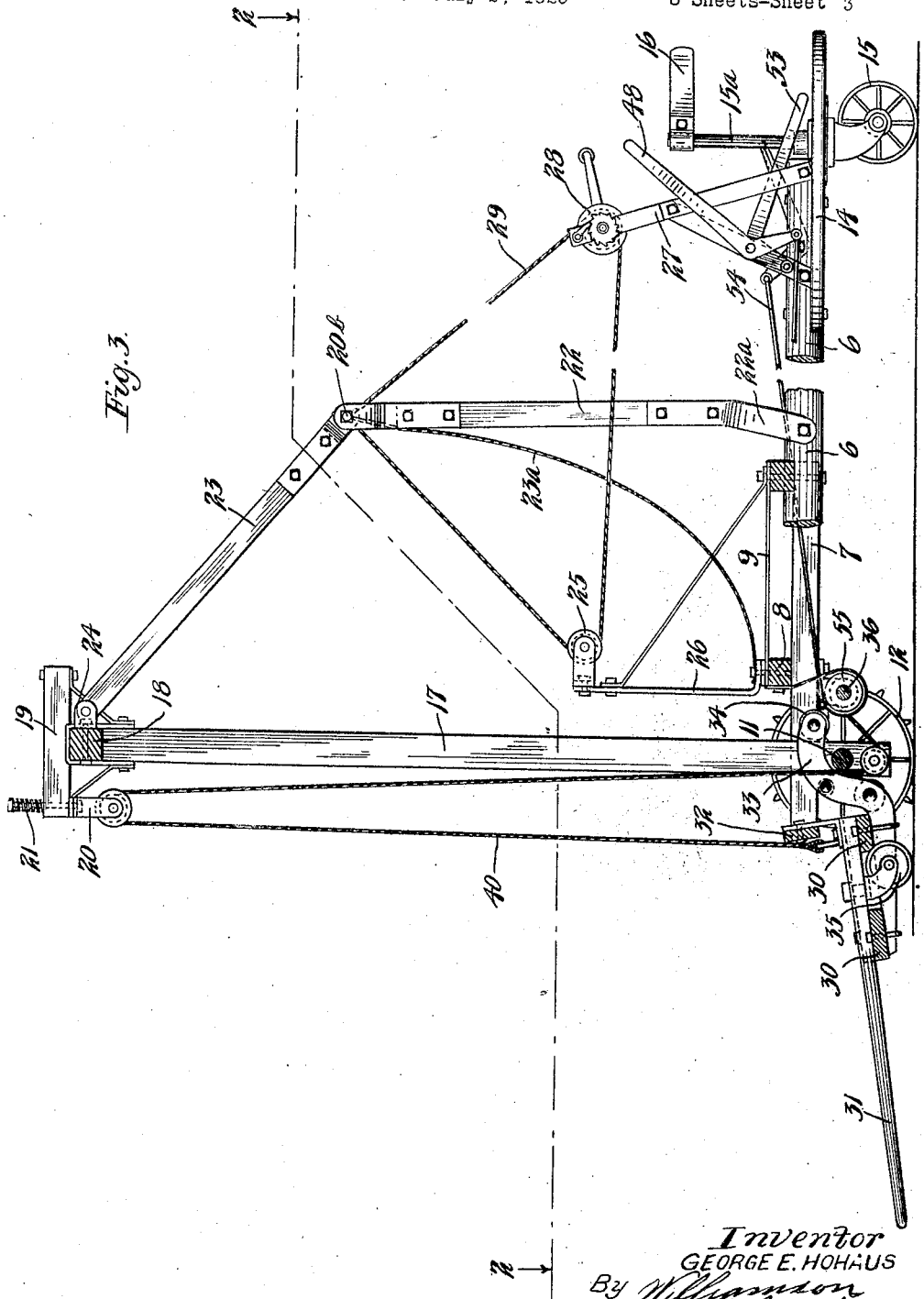

Patented May 25, 1926.

1,585,915

UNITED STATES PATENT OFFICE.

GEORGE E. HOHAUS, OF FORMAN, NORTH DAKOTA.

HAY AND GRAIN STACKER AND LOADER.

Application filed July 2, 1925. Serial No. 41,109.

This invention relates to hay and grain stackers and loaders adapted to rake and gather the hay or grain, elevate the same to a desired height, and dump the load onto a stack or hayrack.

It is the main object of this invention to provide a highly efficient improved device of this nature adapted to elevate the gathered load from power transmitted through the front wheels when the machine is being pushed to the point where the hay or grain is to be dumped.

It is a further object of the invention to provide such a device including efficient means for elevating the pick-up rake or gathering receptacle, said means being operated from the driver's platform at the rear of the machine.

It is an additional object of the invention to provide such a device having a tiltable standard on which the hay fork or gathering receptacle is slidably mounted and to supply a simple mechanism for tilting the standard and holding the same in a desired position, whereby the hay rake may be permitted to engage the ground and, when loaded, may be swung upwardly somewhat, to proper elevating position.

It is a more specific object of the invention to provide in such a device a hoisting mechanism comprising a winding shaft mounted in the frame substantially parallel to the front axle and having one of its ends slidably journaled, whereby the driving connection with the axle may be readily made or broken, as desired.

A still further object of the invention is to provide a simple means for driving the winding shaft from the front axle and in reverse direction to lower the gathering receptacle.

These and other objects of the invention will be apparent from the following description made in connection with the accompanying drawings, wherein like characters refer to similar parts throughout the several views, and, in which—

Fig. 1 is a side elevation of the preferred form of the invention;

Fig. 2 is a plan view of the same;

Fig. 3 is a vertical section taken on the line 3—3 of Fig. 2;

Fig. 4 is a vertical section taken on the line 4—4 of Fig. 2; and

Fig. 5 is a fragmentary plan view on an enlarged scale with some parts broken away, showing the gear shifting means for the hoisting mechanism employed.

The device, as illustrated, comprises a truck frame having the usual horizontally disposed push pole 6 rigidly carrying at the front end thereof the transversely disposed forked member 7. A transverse tie bar 8 is secured across the top of the forked member 7 adjacent the outer ends thereof, and a pair of parallel spaced tie bars 9 traverse the body portion of the forked member 7 and the tie bar 8. Diagonal braces 10 extend from the center of tie bar 8 to the corners of the forked member 7. A rotatable axle 11 extends across the forked portion of the frame and is journaled in bearings secured to the under side of the forward ends thereof. A pair of cleated front wheels 12 are ratcheted to the outer ends of axle 11, impelled outwardly by means of the coiled springs 13 into engagement with the pins 11$^a$ on the outer end of axle 11. Obviously, axle 11 will be turned only when the wheels are moved forwardly over the ground or supporting surface.

A driver's platform 14 is secured to the rear end of the push pole 6 bolted to the under side thereof and having a vertical bearing 14$^a$ therein, in which the upstanding spindle 15$^a$ of a single castor wheel 15 is journaled. A steering tiller 16 is rigidly secured to the upper end of the spindle 15$^a$. The machine is adapted to be pushed in front of draft animals attached to a pair of whiffle trees, not shown, which may be secured to the push pole 6.

A substantially upright standard, comprising a pair of posts 17, preferably of rectangular cross section, secured together at their upper ends by means of the cross bar 18, is pivotally mounted at the front of the horizontally extending frame, the lower ends of posts 17 being pivoted to axle 11, best shown in Fig. 3. Cross bar 18 carries the relatively short transverse beams 19 secured adjacent the end portion thereof, in the forward ends of which are mounted the swiveled pulley brackets 20 held upwardly by means of the coiled springs 21. A pair of elongated links 22 and 23, respectively, pivoted together at their inner ends, pivotally connect the cross bar 18 with the push pole 6, link 22 having its lower end terminate in a fork 22$^a$ pivoted to push pole 6, and link 23 having its upper end pivoted between a pair of projecting ears 24 rigidly secured to the rear side of cross bar 18. A pulley 25 is mounted on the upper end of a relatively short standard 26 secured centrally of the tie bar 8 on the forked portion of the frame. A standard 27, of approximately the height of standard 26, is secured to push pole 6 above the driver's platform 14 and carries the windlass 28 at its upper end, substantially in horizontal alignment with the pulley 25. A flexible member 29 is secured at its intermediate portion with the drum of windlass 28 having its longer end passing through pulley 25 and secured to the pivot pin 22$^b$ of connecting links 23 and 22, the other end of flexible member 29 extending directly from the windlass to pivot pin 22$^b$ and also secured thereto. The windlass 28 and flexible member 29, therefore, form a "steering wheel" windlass adapted to swing links 23 and 22 either forwardly or backwardly and thus tilt the pivoted standard, as desired, and also hold said standard in a desired position.

The gathering implement or rake is slidably mounted on the posts 17 and comprises a pair of parallel spaced transverse bars 30, across which are secured a plurality of outwardly projecting teeth or tines 31. A back member, in the form of a relatively thin bar 32, is mounted edgewise, spaced somewhat above the tops of the tines 31 at their rear ends. Forked members, each comprising a pair of spaced arms 33 bent downwardly and outwardly, are secured at their outer ends to the under side of transverse bars 30. Each of said forked members carry a pair of spaced transverse rollers 34 adapted to engage the front and rear surfaces of the posts 17. The forked members are obviously mounted about the posts 17 acting with the rollers 34 as guide means to permit the gathering implement to be raised or lowered. A pair of single spaced castor wheels 35 are journaled adjacent either side of the gathering implement adapted to support the rear end of said implement at proper distance above the ground to secure the proper pitch on the raking tines when the implement is lowered to gather the hay or grain.

The hoisting mechanism comprises a transverse winding shaft 36 journaled substantially parallel adjacent to the axle 11 in bearings secured to the under side of the forked portion 7 of the frame. One of these bearings 37 is stationary, while the other bearing 38 is slidable longitudinally of the side of frame member 7. Winding shaft 36 carries, adjacent either end thereof, the winding reels 39 to which the ends of flexible members 40 are secured, said flexible members passing under sheaves 41 adjacent either end of axle 11 over pulleys 20 and secured at their other ends to ears 42 secured to the top of a pair of tines 31 adjacent the rear portion thereof. It will be apparent that, when winding shaft 36 is rotated in one direction, the gathering implement will be raised on standard 17, while, when said winding shaft is rotated in the opposite direction, said gathering implement, with the help of gravity, will be caused to drop. To drive the winding shaft 36 for elevation on the gathering implement, a gear 43 is secured adjacent the slidable end thereof, adapted to be engaged with the pinion 44 near the adjacent end of axle 11. Gear 43 and pinion 44 are thrown into or out of engagement by means of the horizontally swinging lever 45 pivoted to one of the longitudinally disposed tie bars 9 on the forked portion of the frame and connected at one end to the slidable bearing 38 by means of the link 46, the other end of lever 45 being connected by an elongated link 47 to the lower end of the hand lever 48 mounted on the driver's platform 14. To permit the axle 11 to drive the winding shaft in reverse direction to lower the gathering implement, a swingable gear arm 49, comprising a pair of spaced members pivoted at their lower ends to winding shaft 36, is provided having journaled therein a relatively small gear 50 in constant mesh with gear 43 rigidly secured to winding shaft 36. When gear 43 is moved out of engagement with the driving pinion 44 by manipulating hand lever 48, the smaller gear 50 may be thrown in mesh with pinion 44 by means of the horizontally swinging lever 51 pivoted substantially to the rear portion of forked member 7 having one of its ends connected to the gear-carrying arm 49 by means of the link 52 and having its opposite end connected to hand lever 53 by means of the elongated link 54. When the machine is moved forwardly across the ground, the winding shaft will then be driven from the axle 11 in reverse direction and the flexible members 40 connected to reels 39 will be slowly unwound, permitting the gathering implement to be lowered. A brake 55 is mounted for operation on the winding shaft 36 controllable by means of the foot lever 56 connected to the brake band by means of an elongated link 57.

*Operation.*

The operation of the machine is probably obvious from the foregoing description but may be briefly summarized as follows:—

When it is desired to rake or gather the hay or grain, the draft animals are, of course, hitched up to the push poles 6, the levers 48 and 53 swung downwardly and the standard 17 is tilted forwardly by operating the "steering gear" windlass 28, thus permitting the gathering implement or rake to contact the ground at its forward end and be supported at the right inclination by means of the castor wheels 35. The machine is then pushed forwardly across the ground and, when the gathering implement is loaded, is directed towards the stack or hay rack on which the load is to be dumped. The lever 48 is then thrown forward and the standard 17 tilted backwardly, thus raising the gathering implement substantially parallel to the ground into elevating position. Lever 48 being thrown forwardly, the pinion 44 and gear 43 will be engaged and the winding reels 39 will wind up the flexible members 40, elevating the gathering implement to the desired height, whereupon the lever 48 will again be thrown downwardly and the brake 56 applied until it is desired to dump the load.

To dump the load, standard 17 is again tilted forwardly by means of the windlass 28, whereupon the several tines 31 will be tilted downwardly, permitting the grain or hay to slide from the gathering implement onto the stack or load. When the load is dumped, brake 56 is released and lever 53 thrown forwardly, whereby the driving connection between gear 50 and pinion 44 is made and the reels 39 are slowly unwound, permitting the gathering implement to be lowered again to raking position. Wheels 12, being ratcheted to the pinions 11ª on axle 11, permit the winding shaft to be rotated only when the machine is pushed across the ground forwardly. The several actions of the machine are controlled by the levers 48 and 53 and the windlass 28 on the driver's platform. The elevation and lowering of the gathering implement is facilitated, as has been stated, while the machine is being pushed to and away from the stack or hay rack to be loaded.

The manipulation of the device is simple and the manipulating levers are conveniently located. The parts of the machine are comparatively few in number, durably constructed and adapted to standard hard usage.

It will be seen from the above description that the applicant has invented a highly efficient hay and grain stacker and loader, capable of wide general usage and efficiently performing the several purposes for which intended.

It will, of course, be understood that various changes may be made in the form, details, proportions and arrangement of the parts without departing from the scope of the invention.

What is claimed is:—

1. A device of the character described having in combination a frame supported on wheels, a rotary axle shaft extending between a pair of said wheels, a gathering receptacle mounted for elevation on said frame, a winding shaft mounted substantially parallel to said axle shaft in said frame, and having driving engagement with said axle shaft, a flexible member secured at one end to said winding shaft adapted to elevate said gathering receptacle and means for moving one of said shafts towards or from the other of said shafts to make or break the driving connection therebetween.

2. The structure set forth in claim 1 and shiftable means mounted on said frame for causing said winding shaft to be driven in either clockwise or counter-clockwise direction as desired.

3. A device of the character described, having in combination a wheel-supported frame provided with a rotary axle extending across the forward end thereof to which the forward wheels are secured, a gathering receptacle mounted for elevation on said frame, a winding shaft mounted in said frame substantially parallel to said axle, a pinion on said axle, a gear on said winding shaft aligned with said pinion, a movably carried gear in constant mesh with said first mentioned gear, means for moving said winding shaft towards or from said axle, and means for causing either of said gears to engage said pinion.

4. A device of the character described, having in combination a wheel-supported frame, an upright standard having its lower end pivoted to said frame, a gathering receptacle mounted for elevation on said standard, hoisting mechanism mounted on said frame and connections between said gathering receptacle and said hoisting mechanism and a steering wheel windlass mounted on said frame and having its flexible member secured to said pivoted standard operative to tilt said standard with respect to said frame and hold the same in a desired position.

5. A device of the character described having in combination a frame supported on wheels, a rotary axle extending between a pair of said wheels, a gathering receptacle mounted for elevation on said frame, a winding shaft mounted substantially parallel to said axle in said frame and having driving engagement with said axle, a reel rigidly secured to said winding shaft, a flexible member secured at one end to said wheel for elevating said gathering receptacle, and means for moving said winding shaft towards or from said axle to make or break the driving connection therewith.

6. A device of the character described having in combination a wheel supported frame having a rotary axle extending across the forward end thereof to which the forward wheels are secured, a gathering receptacle mounted for elevation on said frame, a winding shaft mounted in said frame substantially parallel to said axle and having one of its ends journaled in a slidable bearing, a reel rigidly secured to said winding shaft and having attached thereto a flexible member adapted to elevate said gathering receptacle, a gear on said winding shaft adjacent the slidable end thereof, a pinion on said axle adapted to engage said gear, and means for shifting said slidable bearing to engage or disengage said gears.

7. A device of the character described having in combination a wheel supported frame having a rotary axle extending across the forward end thereof to which the forward wheels are secured, a gathering receptacle mounted for elevation on said frame, a hoisting mechanism on said frame and connections therefrom for elevating and lowering said gathering receptacle, a gear carrying arm movably mounted on said frame, a pair of meshed gears journaled in said arm, one of said gears being connected for driving said hoisting mechanism, a pinion on said axle adjacent said gear-carrying arm, and means for moving said gear-carrying arm to engage either of said gears, as desired, with said pinion whereby said gathering receptacle may be elevated or lowered.

8. A device of the character described having in combination a wheel supported frame having a rotary axle extending across the forward end thereof to which the forward wheels are secured, a gathering receptacle mounted for elevation on said frame, a winding shaft mounted in said frame substantially parallel to said axle and having one of its ends slidably mounted, a reel rigidly secured to said winding shaft and having attached thereto a flexible member adapted to elevate said gathering receptacle, a gear on said winding shaft adjacent the slidable end thereof, a gear-carrying arm pivoted to said winding shaft and carrying a gear in mesh with said first mentioned gear, a pinion on said axle adjacent said gears, means for shifting the slidable end of said winding shaft whereby said first mentioned gear will be engaged with said pinion to elevate said gathering receptacle, and means for swinging said gear-carrying arm to engage said second mentioned gear with said pinion whereby said gathering receptacle may be lowered.

9. The structure set forth in claim 8, and said axle having ratchet engagement with said wheels whereby said axle will be rotated only when the device is moved forwardly along the ground.

10. A device of the character described having in combination a wheel supported frame, an upright standard having its lower end hinged to said frame, a gathering receptacle mounted for elevation on said standard, hoisting mechanism mounted on said frame and connections thereon for elevating said gathering receptacle and holding the same in a desired position, a pair of elongated links pivoted together, one of said links being pivoted at the top of said standard and the other being pivoted to said frame, and a steering wheel windlass mounted on said frame secured to said links at their common pivot point and passing over a sheave mounted adjacent the front of said frame, said steering wheel windlass being operative to tilt said standard with respect to said frame and hold the same in a desired position.

In testimony whereof I affix my signature.

GEORGE E. HOHAUS.